United States Patent [19]
Jellison

[11] 3,909,335
[45] Sept. 30, 1975

[54] PNEUMATIC TIRE TRANSPORTER
[75] Inventor: Frank R. Jellison, Canton, Ohio
[73] Assignee: The General Tire & Rubber Company, Akron, Ohio
[22] Filed: May 22, 1974
[21] Appl. No.: 472,270

[52] U.S. Cl. ............... 156/396; 156/126; 156/127; 156/128 I; 156/414; 156/394 R; 214/1 B; 214/1 Q; 214/130 C
[51] Int. Cl.² ................ B29H 17/14; B29H 17/26; B29H 17/36
[58] Field of Search ............ 156/126, 127, 414, 396, 156/403, 398, 415, 418, 128 I; 214/1 B, 1 Q, 130 C

[56]       References Cited
           UNITED STATES PATENTS

| | | | |
|---|---|---|---|
| 2,679,885 | 6/1954 | Sapp et al. | 156/403 |
| 2,679,886 | 6/1954 | Sapp et al. | 156/403 |
| 3,151,013 | 9/1964 | Nebout | 156/126 X |
| 3,219,510 | 11/1965 | Frazier | 156/403 |
| 3,332,820 | 7/1967 | Porter | 156/126 X |
| 3,374,138 | 3/1968 | Porter et al. | 156/403 X |
| 3,532,577 | 10/1970 | Niclas et al. | 156/396 X |
| 3,556,900 | 1/1971 | Edney et al. | 156/403 |
| 3,687,756 | 8/1972 | Appleby et al. | 156/396 |
| 3,738,893 | 6/1973 | Edler | 156/96 |
| 3,787,262 | 1/1974 | Appleby et al. | 156/123 |

*Primary Examiner*—Clifton B. Cosby

[57]       ABSTRACT

A pneumatic tire transporter is provided for dismounting and transporting a pneumatic tire, tire carcass or the like from a collapsible tire building drum. The transporter includes a transport cage frame capable of being positioned circumferentially about a portion of a pneumatic tire assembled on a collapsible tire building drum. A plurality of support pads are spaced about and slidably supported on said cage frame preferably in two spaced circumferential sets. The support pads are capable of moving radially inwardly to engage the pneumatic tire assembled on the building drum at least adjacent opposite axial end portions of the building drum. The cage frame is supported and moved by a transport base member that is capable of moving the cage frame horizontally to dismount said pneumatic tire from the collapsible building drum and preferably thereafter rotating said pneumatic tire to a vertical position for detaching the detachable means and the pneumatic tire from the remainder of the transporter.

8 Claims, 8 Drawing Figures

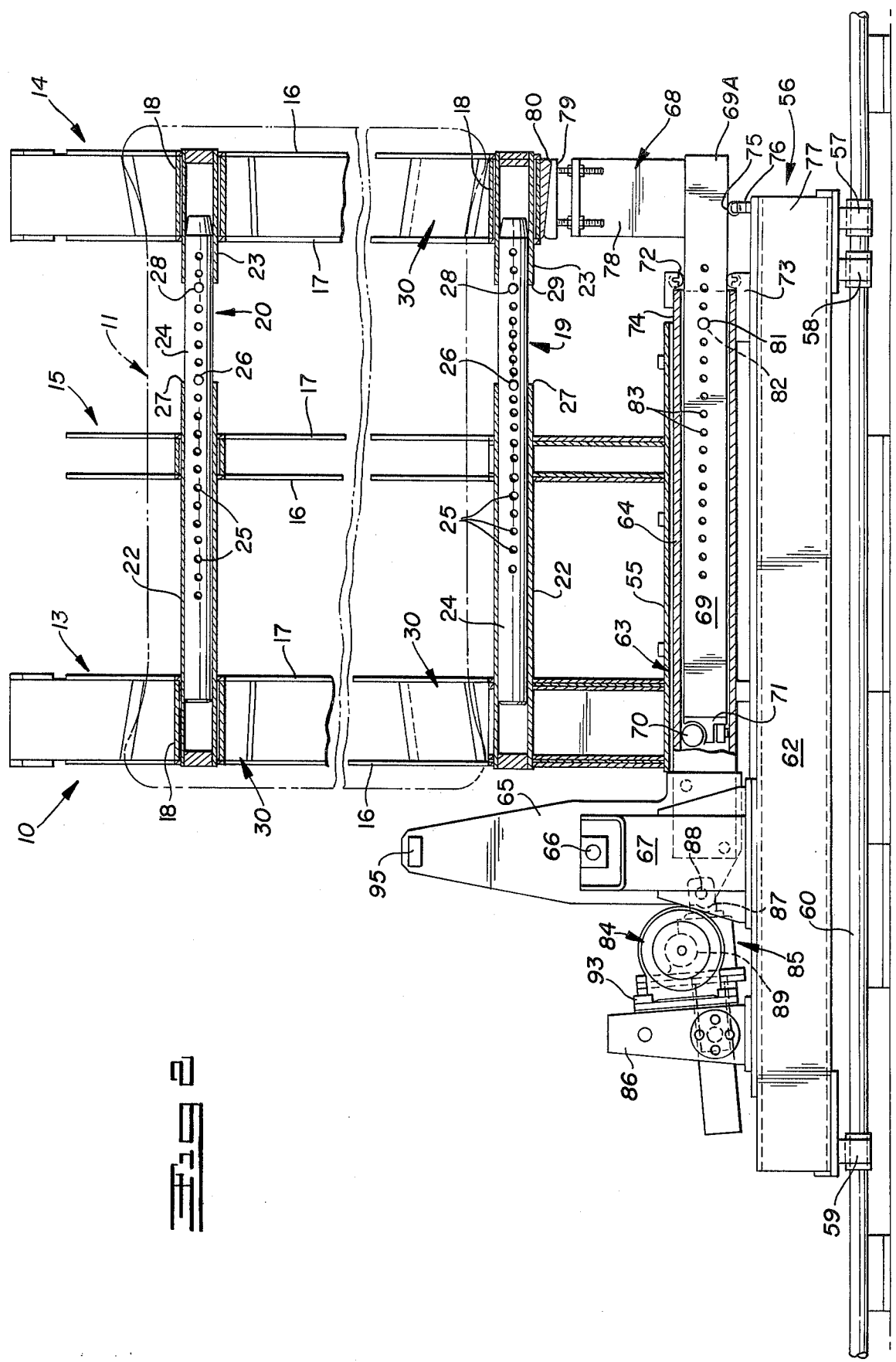

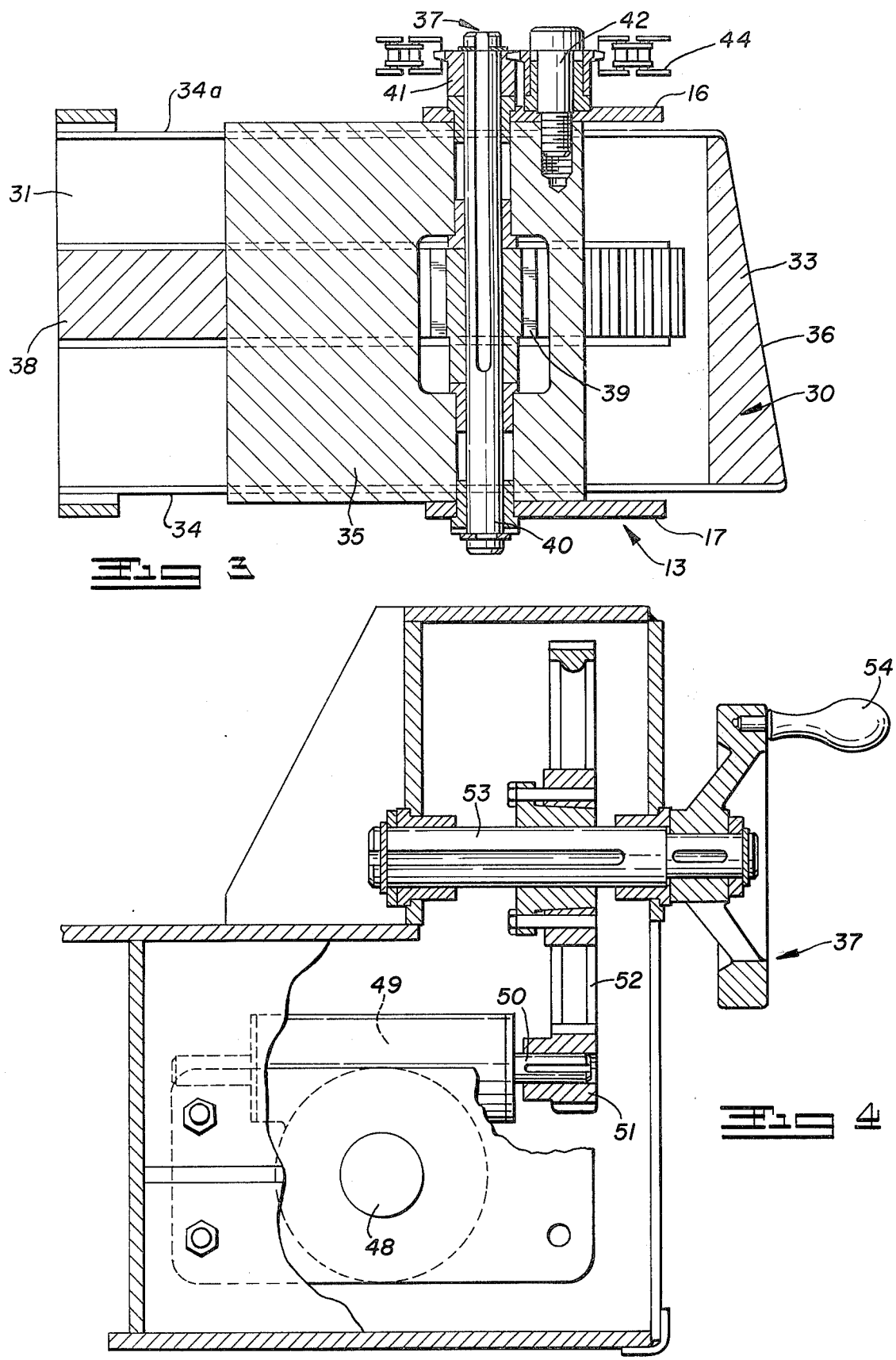

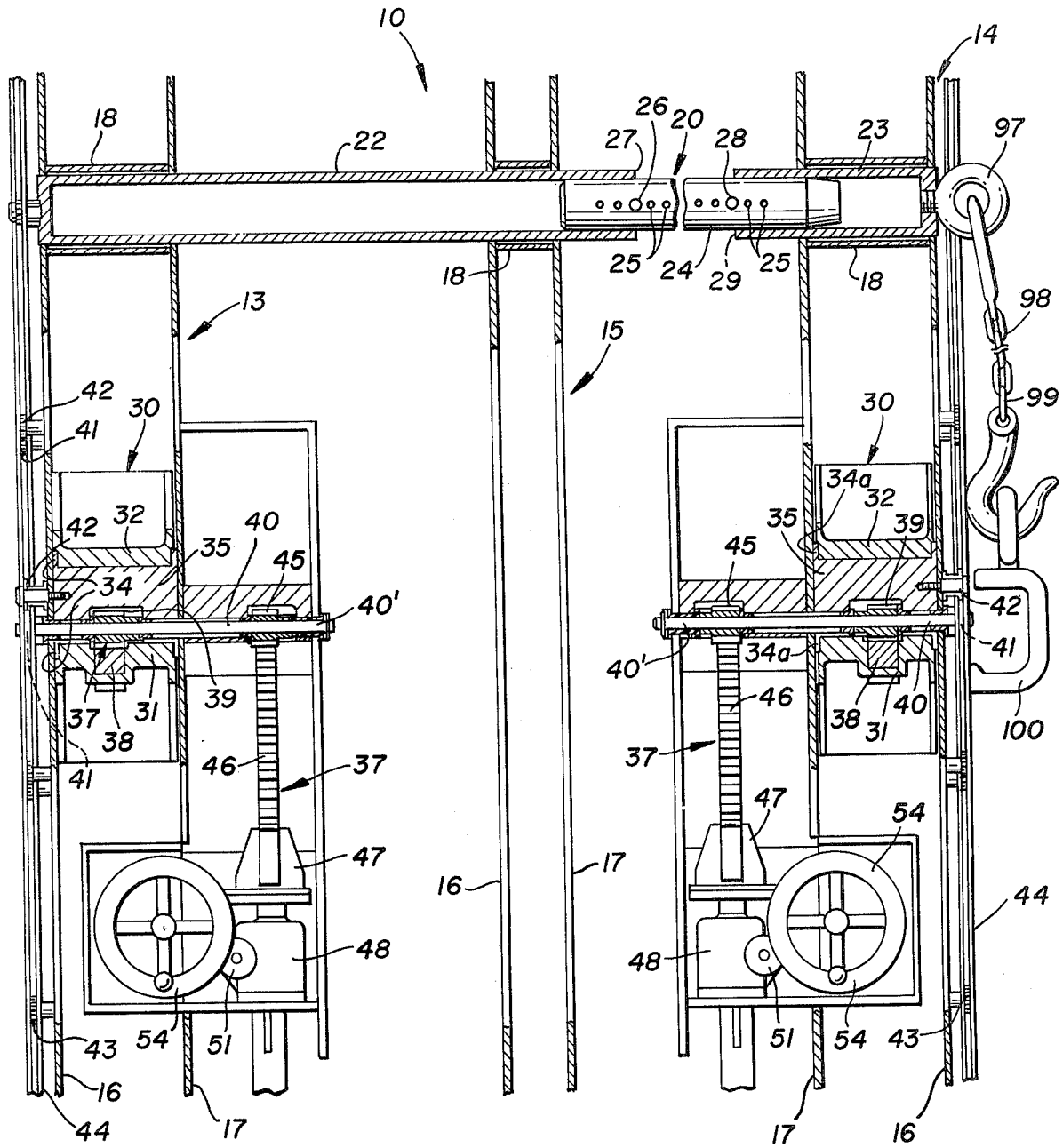

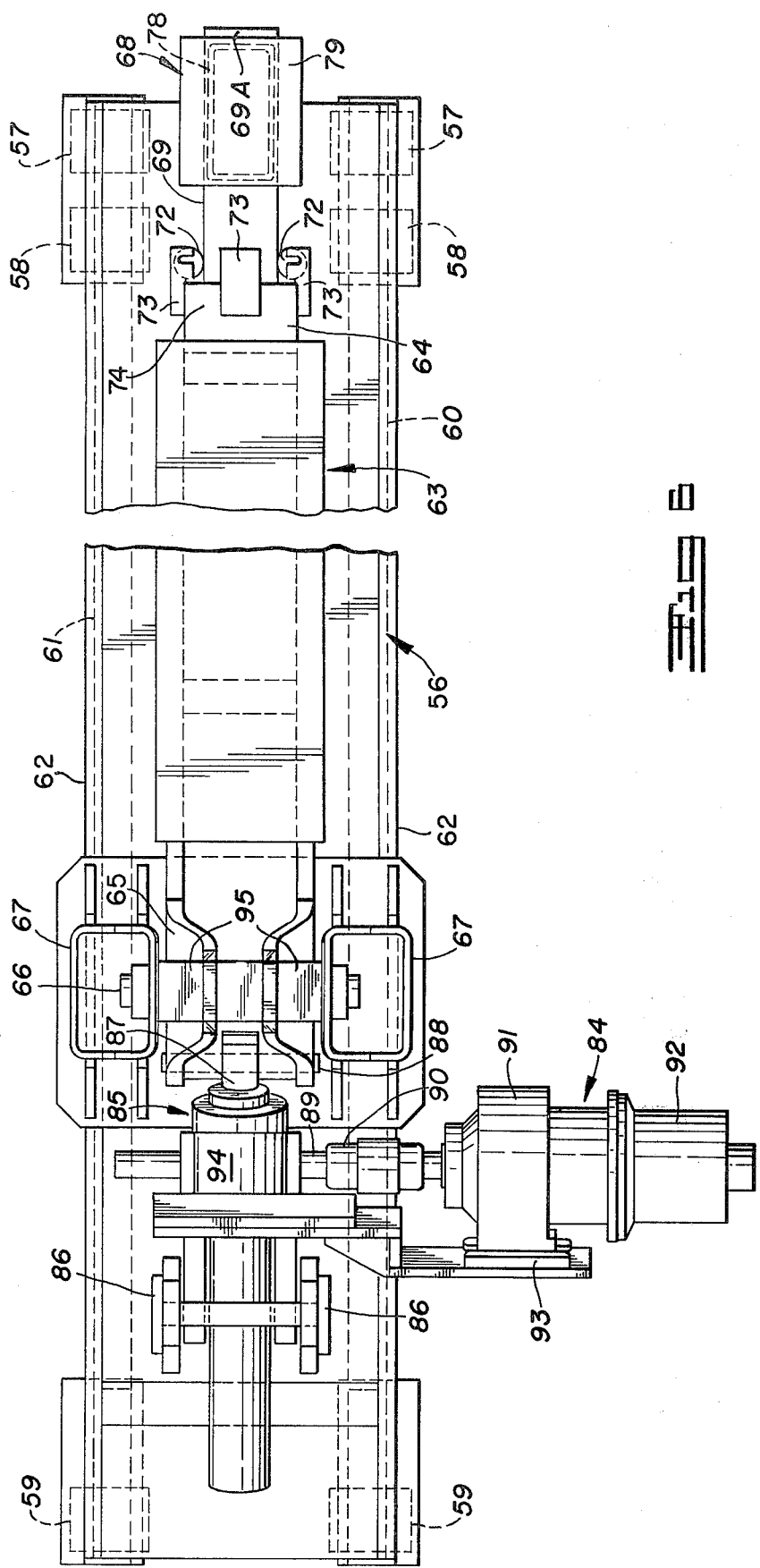

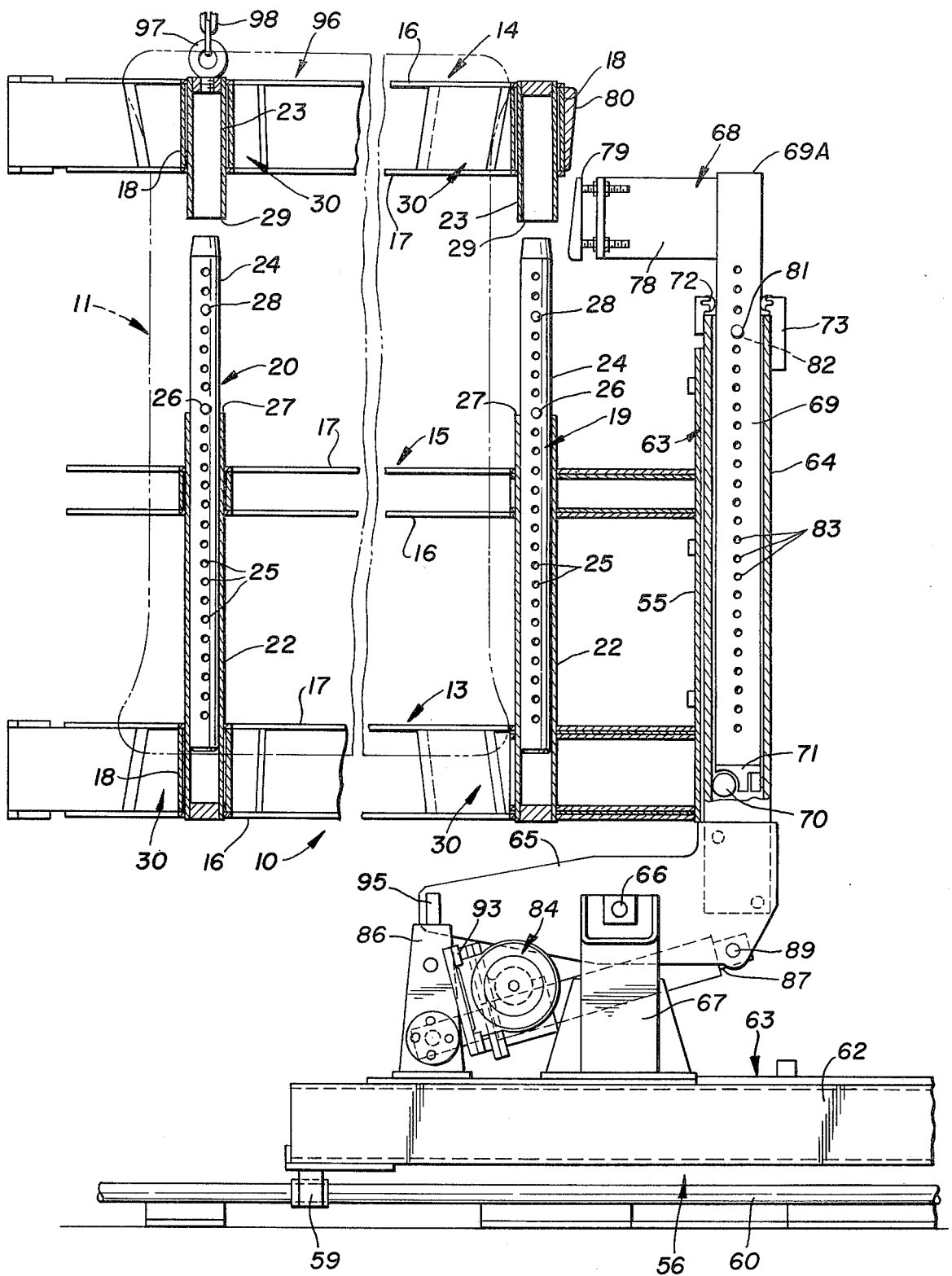

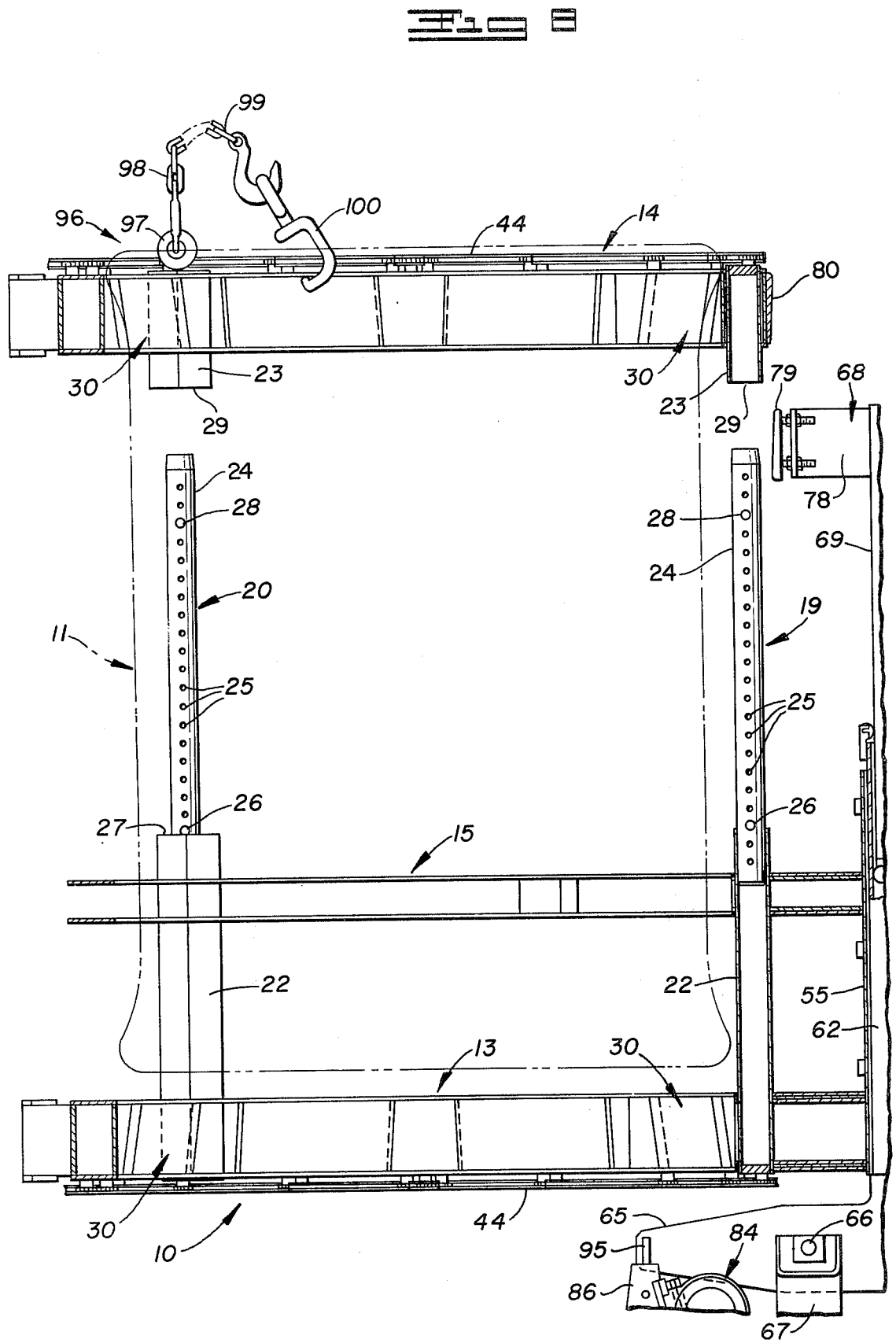

PNEUMATIC TIRE TRANSPORTER

FIELD OF THE INVENTION

The present invention relates to apparatus for building pneumatic tires and particularly off-the-highway radial-ply pneumatic tires.

BACKGROUND OF THE INVENTION

Pneumatic tires are typically comprised of a tire carcass and a tread. The carcass has two or more layers of rubberized fabric or metal usually in a cord or cable form and provides the foundation structure for the tire. The carcass also has reinforcing sidewalls, and a pair of circumferential beads adapted to hold the tire on a rim of a wheel and pneumatically seal the tire with the wheel. The tread of rubber typically filled with carbon black is integrated with the tire carcass and provides the ground-engaging surface of the tire. A breaker or belt assembly is also sometimes provided between the carcass and tread portion and, depending on the type of tire being built, may be assembled with either the carcass or the tread.

Pneumatic tires are categorized by whether the reinforcing cords in the plies of the carcass are radial or bias to the axial centerline of the tire. Tires of the bias type have been built by the "flat band" method utilizing equipment such as that described in U.S. Pat. Nos. 2,614,951, 2,614,952, 2,628,652, 3,171,769, 3,156,601 and 3,645,826, all of which are owned by the assignee of the present application. Typically, tires of radial type have been built by the "toric match" method using a method and equipment such as that described in U.S. Pat. No. 3,475,254, which is also owned by the assignee of the present application.

The building techniques for building both radial and bias ply tires are similar in that the tires are built on one or more expansible-collapsible cylindrical drums. After the building of the tire carcass or the tire is completed, the drum is collapsed and the tire removed typically by hand. However, off-the-highway tires are pneumatic tires of very large or "giant" size for tractors, road graders, earthmovers, and the like. Such pneumatic tires are too large and massive for simple manual removal from a building drum. Rather, mechanical dismounting and transporting means must be utilized such as those described in U.S. Pat. No. 3,787,262.

The problem is particularly acute with radial-ply off-the-highway tires. Such tires do not have sufficient strength to support themselves in an uninflated state. Moreover, distortion under the force of its own weight can severely degrade the quality of the tire produced. The tires cannot, therefore, be directly dismounted and transported by simply fastening the tire or tire carcass to, for example, an overhead crane. For this reason, the production of radial-ply off-the-highway tires are extremely difficult and expensive, and even then the quality of the tires produced and quantative yields has not been completely satisfactory.

The present invention overcomes these difficulties and disadvantages of known tire building devices. The invention provides for the dismounting and transporting of carcass and completed giant off-the-highway pneumatic tires without distortion of the tire of its own weight.

SUMMARY OF THE INVENTION

A pneumatic tire transporter is provided for dismounting and transporting a pneumatic tire or portion thereof, e.g. a tire carcass, a breaker assembly or a breaker-tread assembly, from a collapsible tire building drum where it is assembled. The invention is particularly useful in dismounting and transporting at least portions of giant off-the-highway pneumatic tires without flexing and distorting the tire under its own weight.

The tire transporter comprises a transport cage frame, preferably adjustable to length, capable of being positioned circumferentially about a portion of a pneumatic tire assembled on a collapsible tire building drum. The transport cage frame slidably supports a plurality of support pads spaced about the cage frame preferably in axially spaced circumferential sets. The support pads are capable of moving radially inwardly to engage the portion of the pneumatic tire assembled on the collapsible building drum at least adjacent opposite axial end portions of the building drum.

The transport cage frame is supported by a transport base member movable along the axial centerline of the transport cage frame and preferably adjustable to length to support the cage frame on adjustment. The transport base member moves said cage frame with at least a portion of the pneumatic tire engaged therein horizontally to dismount said pneumatic tire portion from the collapsible tire building drum.

Preferably, each said support pad has an angular tire engaging surface that extends radially inwardly toward the axial and radial centerlines of the transport cage frame. The support pads are thus able to better engage the pneumatic tire portion for dismounting and transporting as hereinafter more fully described. In addition, the transporter also includes preferably a pad drive means that is adapted to simultaneously drive at least one circumferential set of said support pads radially inwardly to engage the pneumatic tire portion on the collapsible building drum. More desirably, one drive means is provided for each circumferential set of support pads to independently drive said support pads of the circumferential set.

Preferably, a rotational drive means is also provided for rotating at least a portion and preferably all of the transport cage frame to position the axis of the cage frame substantially vertically. Also, a detachable assembly is preferably included that comprises at least a part of the cage frame and at least some of the support pads. Preferably, the detachable assembly includes the circumferential set of support pads positioned at the top of the transporter when the pneumatic tire portion is vertically positioned. The detachable assembly is capable of detaching from the transport base member while said support pads thereof engage the pneumatic tire at least at one axial end portion so that the pneumatic tire portion may be transported from the transport base and the remaining cage frame without flexing and distorting the pneumatic tire under its own weight.

Other details, objects and advantages of the invention will become apparent as the following description of the presently preferred embodiments and presently preferred methods of practicing the same proceeds.

BRIEF DESCRIPTION OF THE DRAWINGS

In the accompanying drawings, the preferred embodiments of the invention and presently preferred methods of practicing the invention are illustrated, in which:

FIG. 2 is a side elevational view in cross-section taken along line 2—2 of FIG. 1;

FIG. 3 is a cross-sectional view taken along line 3—3 of FIG. 1;

FIG. 4 is a cross-sectional view, with portions broken away, taken along line 4—4 of FIG. 1;

FIG. 5 is a cross-sectional view taken along line 5—5 of FIG. 1;

FIG. 6 is a top view of the base member of the pneumatic tire transporter shown in FIG. 1;

FIG. 7 is an elevational view in cross-section corresponding to FIG. 2 showing the transporter vertically positioned; and FIG. 8 is a partial elevational view in cross-section corresponding to FIG. 2 showing dismounting and transport of the portion of the pneumatic tire from the collapsible tire building drum.

DESCRIPTION OF THE PREFERRED EMBODIMENTS

Figure 1:
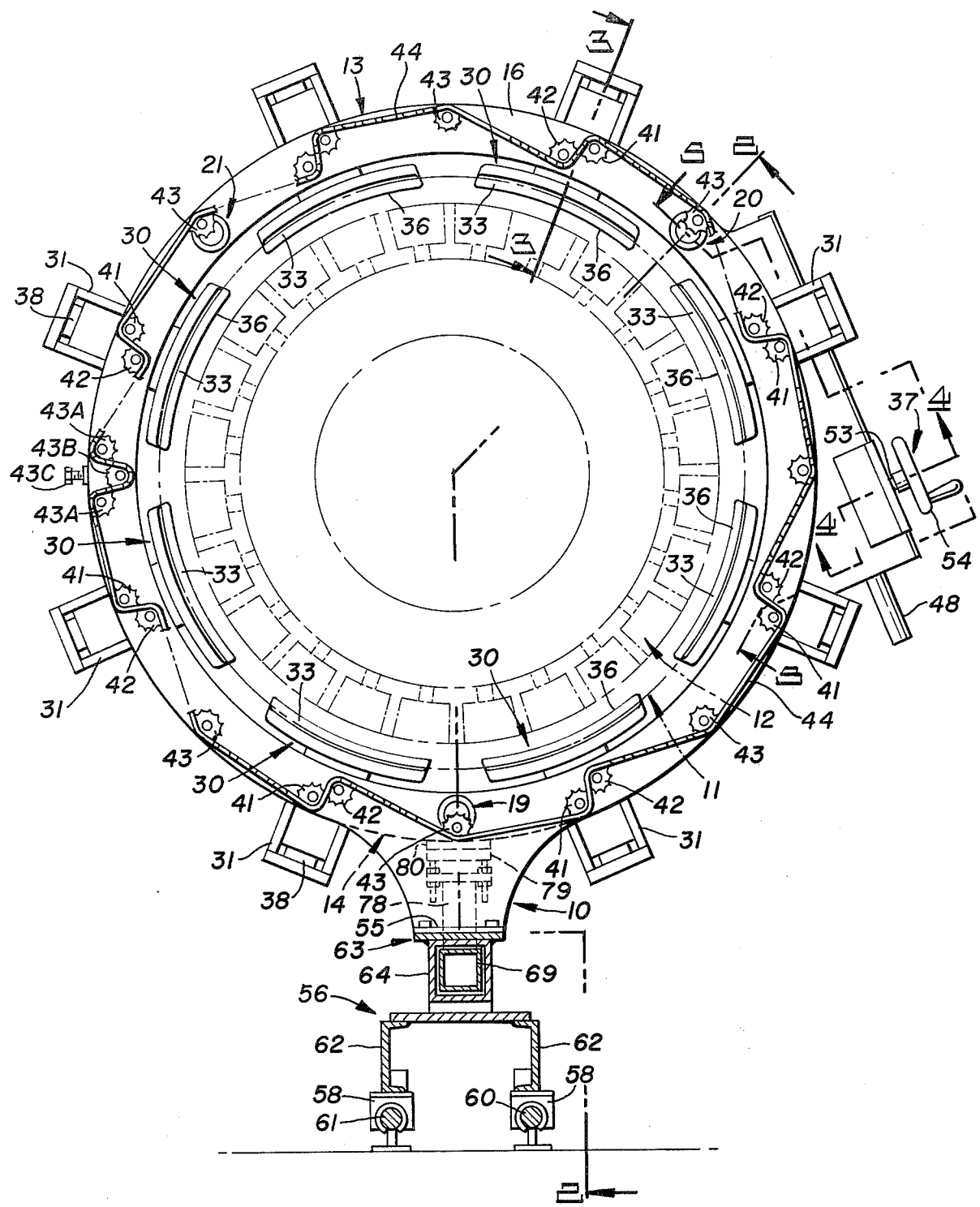
FIG. 1 is a side elevational view of a pneumatic tire transporter embodying the present invention positioned circumferentially about a portion of a pneumatic tire assembled on a collapsible tire building drum.

Referring to FIG. 1, a pneumatic tire transporter is shown for dismounting and transporting at least a portion of a pneumatic tire from a collapsible tire building drum. The view is from the inboard end of the building drum from where the drum is mounted in cantilever.

The pneumatic tire transporter comprises a transport cage frame 10 that is positioned circumferentially about, for example, tire carcass 11 of a giant off-the-highway tire assembled on collapsible tire building drum 12. Transport cage frame 10 includes bottom clamping ring 13 and top clamping ring 14 with reinforcing ring 15 spaced between rings 13 and 14. Each ring 13, 14 and 15 includes two parallel ring plates 16 and 17 spaced apart and reinforced by rectangular tubular spacers 18 spaced about the ring preferably at roughly 30°, 90°, 120°, 210°, 270° and 300°. Rings 13, 14 and 15 are joined by adjustable telescoping members 19, 20 and 21 preferably symmetrically spaced about collapsible building drum 12 horizontally, with telescoping member 19 at the bottom of the transport cage frame.

Each adjustable telescoping member of transport cage frame 10 includes first outer tubular member 22 rigidly mounted to bottom clamping ring 13 and reinforcing ring 15, and second outer tubular member 23 rigidly mounted to top clamping ring 14. Each tubular member 22 and 23 is joined by inner adjusting tubular member 24 having opposite end portions slipped into outer tubular members 22 and 23. Each inner adjusting tubular member 24 also has holes 25 equally spaced therealong.

Transport cage frame 10 is assembled and adjusted to length, for reasons hereinafter described, by inserting cage pins 26 into corresponding holes 25 in inner tubular members 24, and sliding inner tubular members 24 into first outer tubular members 22 until cage pins 26 engage end portions 27 of first tubular members 22. Cage pins 28 are then inserted in corresponding holes 25 adjacent end portions of inner tubular members 24, and top clamping ring 14 is positioned by sliding second outer tubular members over inner tubular member 24 until cage pins 28 engage end portions 29 of second tubular members 23. Preferably, the assembly is performed for convenience with the transporter away from the collapsible building drum and the transport cage frame vertically positioned as hereinafter described by reference to FIG. 7.

A plurality of support pads 30 are preferably symmetrically spaced about bottom clamping ring 13 and top clamping ring 14, respectively, in two circumferential sets. Each pad 30 is slidably supported on ring 13 or 14 to move radially to engage tire carcass 11 or the like assembled on collapsible tire building drum 12 adjacent opposite axial end portions of the building drum. Each support pad 30 has two U-shaped members 31 and 32 extending in parallel from pad head 33. U-shaped members 31 and 32 are spaced apart back-to-back and have grooves 34 and 34a to slidably support the pad on I-shaped support member 35 fastened between ring plates 16 and 17 of clamping rings 13 or 14.

Each support pad 30 has an angular tire engaging surface 36 preferably of arcuate shape. Said surface 36 is angled radially inwardly toward the axial and radial centerlines of transport cage frame 10 to enable the surface to grip the tire carcass preferably adjacent the bead ring and maintain the shape of the carcass during the dismounting and transporting as hereinafter described.

Preferably, drive means 37 is provided for each circumferential set of support pads 30 that simultaneously drives each support pad 30 of the set radially inwardly to engage tire carcass 11. Each drive means 37 includes a rack 38 rigidly positioned along each U-shaped member 31 that meshes with spur gear 39 rigidly mounted on shaft 40. Shaft 40 in turn extends through I-shaped support member 35 and is rotatably mounted therethrough. At the end of each shaft 40 is rigidly fastened a drive sprocket 41, with an idler sprocket 42 rotatably mounted adjacent thereto radially of and along the ring plate. Midway between each support pad 30 along the clamping ring is also positioned an idler sprocket 43 rotatably mounted on the ring plate. Endless drive chains 44 extend circumferentially about transport frame 10 adjacent the axial ends to engage drive sprockets 41 and idler sprockets 42 and 43 as shown to provide simultaneous radial drive for support pads 30. Idler sprockets 43A and 43B, and adjustment screws 43C by which sprocket 43B is movable, are provided for adjusting the tension of drive chains 44.

Each drive chain 44 is in turn driven by extending shaft 40' at support pad 30 as specifically shown in FIG. 5, and rigidly fastening second spur gear 45 thereon. Spur gear 45 is in turn meshed with rack 46 which is driven through rack adapter 47 by screw jack 48. The worm gear 49 of screw jack 48 is fastened on a common shaft 50 to spur gear 51, which meshes with large spur gear 52. Spur gear 52 in turn is fastened on a common shaft 53 to hand wheel 54.

By this arrangement, support pads 30 of each circumferential set can be independently driven to simultaneously slide radially inwardly to engage tire carcass 11 adjacent each axial end portion thereof. A large mechanical advance of, for example, 20 to 1, or more, is provided so that a small rotational force on each hand wheel 54 can apply a large radial engaging force to tire carcass 11 at each support pad 30. In this way, the tire carcass can be firmly gripped by the support pads and held without distortion in both the horizontal and vertical position.

Transport cage frame 10 is supported by base plate 55 extending from and between clamping and reinforcing rings 13 and 15 on transport base 56. Transport base 56 is slidably mounted to move axially of collapsible tire building drum 12 by ball bushings 57, 58 and 59 on parallel, spaced apart rails 60 and 61. Ball bushings 57, 58 and 59 extend from main frame 62 to each rail 60 and 61 to support base 56. Main frame 62 in turn rotatably supports cage lift 63. Cage lift 63 includes a first rectangular tubular member 64 fastened to base plates 65. Base plates 65 are then pivotally mounted by pivot 66 from cradle mounts 67, which are mounted outwardly on either side of cage lift 63 and form a part of main frame 62.

Cage lift 63 also includes adjustable cage mount 68 comprised of second rectangular tubular member 69 which telescopes into first rectangular tubular member 64. Second tubular member 69 rides within first tubular member 64 by cam rollers 70 rotatably mounted on roller mounts 71 at the inserting end thereof, and cam rollers 72 mounted by cam yokes 73 at end 74 of first rectangular member 64. Second tubular member 69 is also supported by cam roller 75 mounted in cam yoke 76 adjacent end portion 77 of main frame 62.

Adjustable cage mount 68 further includes a cage support guide 78 extending upwardly from end portion 69A of second rectangular tubular member 69 and having an adjustable plate or pad 79 at the upper end thereof. Cage mount 68 can thereby be adjusted by telescoping second tubular member 69 into first tubular member 64 until pad 79 engages a corresponding support plate 80 extending from upper clamping ring 14 of transport cage frame 10. Lift pin 81 is then inserted in corresponding holes 82 and 83 through first tubular member 64 and second tubular member 69, respectively, to lock the cage lift 63 to length. Transport base 56 thus supports the transport cage frame 10 at both bottom and top clamping rings 13 and 14 with changes in length of transport cage frame 10.

Drive means 84 preferably is provided for rotating transport cage frame 10 and support pads 30 slidably positioned thereon from a horizontal to a substantially vertical position, where the central axis of cage frame 10 is substantially vertical. Drive means 84 includes worm screw jack 85 rigidly fastened by jack mounts 86 on main frame 62. Worm screw 87 of screw jack 85 is fastened by pivot shaft 88 at outer end portions thereof to base plates 65 of cage lift 63. Drive shaft 89 of screw jack 85 meshes with worm screw 87 and is driven through a suitable coupling 90 and speed reducer 91 by air motor or the like 92. Speed reducer 91 and air motor 92 are mounted by motor mount 93 from housing 94 of jack screw 85 so that the entire assembly can move with the worm screw jack 83.

In operation, drive means 84 causes cage lift 63 of transport base 56 to rotate so that transport cage frame 10 has its axis substantially vertical as shown in FIG. 7. Air motor 92 has a large mechanical advance by virtue of driving screw jack 85 so that tire carcass 11 of massive size positioned within cage frame 10 can be readily rotated from a horizontal to a vertical position. Further, the drive is positive so that cage frame 10 can be stopped at any angular position between the horizontal and the vertical as desired, as well as readily lower cage frame 10 from the vertical to the horizontal position. Also, it should be noted in this connection that base plates 65 extend to support stop 95, which engages jack mounts 86 to provide support and stability for cage frame 10 when the cage frame is vertically positioned.

Referring to FIG. 8, detachable assembly 96 is provided comprising top clamping ring 14 and the circumferential set of support pads 30 slidably supported thereon. An overhead crane or the like can be thus used to transport tire carcass 11 by hooking the crane (not shown) to the top clamping ring 14 by eye bolt 97 and chain 98. Preferably a safety chain 99 is also attached from clamping ring 14 via assembly 100 to the hook-up to the overhead crane.

The overall operation of the transporter is initiated with the cage transporter frame 10 in horizontal position axially away from collapsible building drum 12. The transporter assembly is moved either manually or automatically axially along rails 60 and 61 on ball bushings 57, 58 and 59 circumferentially about building drum 12 until clamping rings 13 and 14 are positioned symmetrically about the radial centerline of the building drum, adjacent the axial end portions of the building drum as shown in FIG. 2. If necessary, adjustment is typically performed by telescoping members 19, 20 and 21 and adjustable cage mount 68 before this movement is made, to provide for positioning of clamping rings 13 and 14 as desired. Positioning of adjustable pad 79 under top clamping ring 14 provides support for cage frame 10 so that sagging and binding of the cage frame with the building drum is avoided during dismounting.

Drive means 37 is then actuated, manually or automatically, to move support pads 30 in the two circumferential sets radially inwardly to engage tire carcass 11 about opposite axial end portions of tire building drum 10. Building drum 10 is then collapsed leaving tire carcass 11 maintained in cage transport frame 10. Because of the surfaces 36 of support pads 30 being angled radially inwardly toward the axial and radial centerlines of the building drum, tire carcass 11 is maintained under axial tension along its length and is not permitted to flex and distort under its own weight.

The transport assembly with tire carcass 11 supported in cage frame 10 is then moved axially along rails 60 and 61, either manually or automatically, until the cage frame 10 clears the outboard end of the tire building machine. Drive means 84 is then actuated, manually or automatically, to rotate cage frame 10 and cage lift 63 so that the axial centerline of cage frame 10, as well as tire carcass 11 therein, is vertical. An overhead crane (not shown) is then positioned over the transporter and hooked to chain 98 of detachable assembly 96. Support pads 30 of bottom clamping ring 13 are then disengaged from tire carcass 11, and the detachable assembly 96 with tire carcass 11 engaged therein is transported away from the remainder of cage frame 10 and the transporter for subsequent application of the tire breakers and tread, and then curing. The tire carcass is held uniformly about its circumference at the uppermost axial end portion so that it does not distort or flex during transport.

After positioning of tire carcass 11 elsewhere, support pads 30 of detachable assembly 96 are disengaged from the tire carcass, and detachable assembly 96 is returned by the overhead crane to be reattached to transport cage frame 10. The cage frame 10 is then lowered to the horizontal position and the transporter is ready for reuse.

While presently preferred embodiments have been shown and described with particularity, it is distinctly understood that the invention may be otherwise variously embodied and utilized. For example, the invention has been specifically described by reference to the dismounting and transporting of a tire carcass for an off-the-highway tire. It is contemplated that the invention may be similarly utilized in dismounting and transporting of a breaker assembly, a breaker and tread assembly or a completed pneumatic tire for an off-the-highway radial or bias ply tire or another pneumatic tire.

I claim:

1. A pneumatic tire transporter for dismounting and transporting at least a portion of a pneumatic tire from a collapsible tire building drum comprising:
   A. a transport cage frame capable of being positioned circumferentially about a portion of a pneumatic tire assembled on a collapsible tire building drum;
   B. a plurality of support pads spaced about and slidably supported on said cage frame and capable of moving radially inwardly to engage the portion of the pneumatic tire assembled on the collapsible tire building drum at least adjacent opposite axial end portions of the building drum;
   C. a transport base member for supporting said cage frame and moving said frame with at least a portion of a pneumatic tire engaged therein horizontally to dismount said portion of a pneumatic tire from the collapsible tire building drum;
   D. drive means for rotating at least a portion of the transport frame to position the central axis of the transport cage frame substantially vertically; and
   E. a detachable assembly comprising at least a portion of said transport frame and at least some of the support pads capable of detaching from said transport base member while said support pads engage the pneumatic tire at least adjacent one axial end portion to transport the portion of one pneumatic tire.

2. A pneumatic tire transporter as set forth in claim 1 wherein:
   the transport cage frame includes means for adjusting said cage frame in axial length.

3. A pneumatic tire transporter as set forth in claim 1 wherein:
   said support pads are disposed in two circumferential sets and are capable of engaging the portion of the pneumatic tire inwardly adjacent each axial end portion of the collapsible building drum.

4. A pneumatic tire transporter as set forth in claim 3 wherein:
   each support pad has an angular tire engaging surface extending radially inwardly toward the axial and radial centerlines of the transport cage frame.

5. A pneumatic tire transporter as set forth in claim 3 comprising in addition:
   drive means for simultaneously driving at least one circumferential set of said support pads radially inwardly to engage the portion of the pneumatic tire assembled on the collapsible tire building drum.

6. A pneumatic tire transporter as set forth in claim 5 wherein:
   one said drive means is provided for each circumferential set of support pads to independently drive said set of support pads.

7. A pneumatic tire transporter as set forth in claim 3 wherein:
   only one circumferential set of support pads are included in said detachable assembly.

8. A pneumatic tire transporter as set forth in claim 7 wherein:
   each support pad has an angular tire engaging surface extending radially inwardly toward the axial and radial centerlines of the transport cage frame.

* * * * *